United States Patent [19]

Hutar et al.

[11] 4,021,078

[45] May 3, 1977

[54] GAS JET PLUG ASSEMBLY

[75] Inventors: William F. Hutar, Watchung; Donald G. Marting, Murray Hill, both of N.J.

[73] Assignee: Coaltek Associates, Morristown, N.J.

[22] Filed: Feb. 6, 1976

[21] Appl. No.: 655,912

Related U.S. Application Data

[63] Continuation of Ser. No. 484,824, July 1, 1974, abandoned.

[52] U.S. Cl. .................................. 302/24; 302/31
[51] Int. Cl.² .................................... B65G 53/16
[58] Field of Search ............... 302/2 R, 24, 29, 31; 222/41, 48; 214/1 BE; 285/158, 354, 386, DIG. 5; 201/38; 202/262, 263

[56] References Cited

UNITED STATES PATENTS

| 1,028,777 | 6/1912 | Power | 285/386 |
| 1,031,587 | 7/1912 | Reisik | 285/DIG. 15 |
| 1,948,725 | 2/1934 | McClintock | 285/386 |
| 2,170,010 | 8/1939 | Conner | 285/158 |
| 3,006,514 | 10/1961 | Collins | 222/48 |
| 3,272,387 | 9/1966 | Katz et al. | 222/48 |
| 3,420,410 | 1/1969 | Marder | 222/48 |
| 3,533,649 | 10/1970 | Williams | 285/354 |
| 3,537,755 | 11/1970 | Schmidt | 302/24 |

FOREIGN PATENTS OR APPLICATIONS 1,262,699  4/1960  France ........................... 285/174

Primary Examiner—Evon C. Blunk
Assistant Examiner—Jeffrey V. Nase
Attorney, Agent, or Firm—Gerard P. Rooney

[57] ABSTRACT

The gas jet plug assembly is adapted for introducing gas into a pipe and includes: a gas jet plug; a sleeve; and a holding cap. The sleeve is mounted on an outside surface of a wall of the pipe around the periphery of a hole in which the plug is disposed. The plug is supported by the sleeve and held in place within the sleeve by the holding cap. The plug has an interior bore which is substantially straight and disposed substantially parallel to the longitudinal axis of the plug. The plug has one or more gas jet nozzles which communicate between the bore and the interior of the pipe. The plug has an exterior member, such as a shoulder, disposed around at least a portion of the outer periphery of the plug. The sleeve has an interior bore through which at least a portion of the plug extends. The interior bore of the sleeve has an interior member, such as a shoulder. The interior member of the sleeve is adapted to cooperate with the exterior member of the plug to position the surface of the downstream end of the plug in precise alignment with the adjacent interior surface of the pipe. Means are provided to position the gas jet nozzles of the plug to point in the direction of movement of granular particles within the pipe.

17 Claims, 9 Drawing Figures

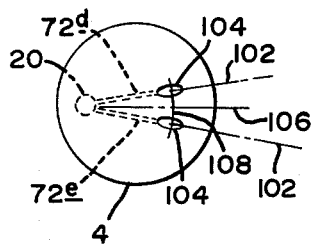
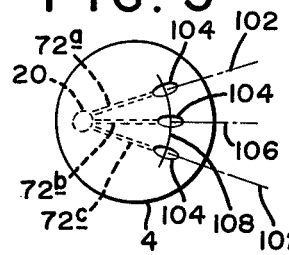
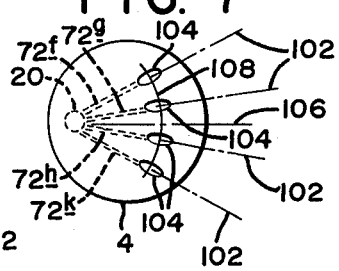
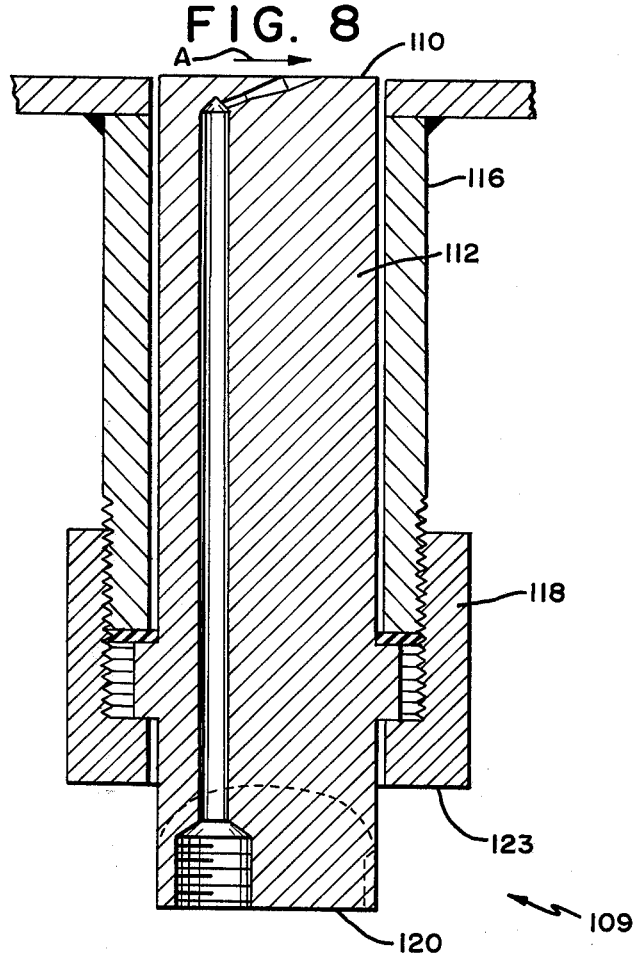
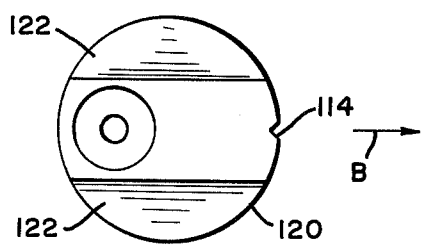

GAS JET PLUG ASSEMBLY

This is a continuation of application Ser. No. 484,824, filed July 1, 1974, now abandoned.

BACKGROUND OF THE INVENTION

This invention relates to an improved apparatus for introducing gas under pressure into a pipe, such as a pipe which is part of a pipeline adapted for conveying granular particles. One example of a use for such an apparatus is in the conversion of coal to coke. In this example, gas jet plug assemblies of this invention are used for the introduction of super-heated steam under pressure into a pipeline charging system which carries coal particles to a coke oven.

Prior art apparatus for introducing steam into a pipeline are disclosed in the following United States Patents. U.S. Pat. Nos. 3,457,141 and 3,523,065 to Schmidt disclose a jet plug 52 which is illustrated most clearly in FIG. 5 of each patent. U.S. Pat. Nos. 3,432,398 and 3,537,755 to Schmidt disclose a jet nozzle 37 which is illustrated most clearly in FIGS. 2 and 3 of each patent. U.S. Pat. No. 3,374,151 to Schmidt discloses a plug 135 which is illustrated most clearly in FIGS. 4 and 5.

The prior art apparatus disclosed in the foregoing patents consists of one element, a plug. This prior art plug is attached directly to a wall of a pipe by means of exterior threads on the downstream end of the plug. A steam supply line is fitted into the upstream end of the plug by means of interior threads in the plug.

Another prior art apparatus, not disclosed in the foregoing patents, consists of two elements; a plug and a sleeve. This second prior art plug is supported by the prior art sleeve. The prior art sleeve is adapted to be attached to a wall of a pipe, such as by means of welds. The prior art sleeve has an interior bore and interior screw threads. The second prior art plug has exterior screw threads and is adapted to fit into the bore of the sleeve. The exterior screw threads of the second prior art plug engage the interior screw threads of the prior art sleeve. The steam line is fitted into the upstream end of the plug.

It is desirable to improve the design of the prior art gas jet plug assemblies in the following ways. First, it is desirable to have a design which would better facilitate positioning the plug so that the surface on the downstream end of the plug, which is positioned in the interior of the pipe, is precisely aligned with the adjacent interior surface of the pipe, without the plug either extending too far into the pipe or not far enough. Second, it is desirable to have a design which would better facilitate positioning nozzles at the downstream end of the plug to be pointed in precisely the correct direction with reference to the direction of flow of coal particles within the pipe. Third, it would simplify manufacturing of the plug if an interior bore in the plug leading to the nozzles was substantially parallel to the longitudinal axis of the plug.

SUMMARY OF THE INVENTION

The apparatus of this invention is a gas jet plug assembly for introducing gas under pressure into a pipe adapted to convey granular particles. The assembly includes three elements: a gas jet plug; a sleeve; and a holding cap. The sleeve is adapted to be mounted on the outside surface of the wall of a pipe around the periphery of a hole in which the plug is adapted to be disposed. The plug is supported by the sleeve and held in place within the sleeve by the holding cap.

The gas jet plug of this invention has a downstream end adapted to be disposed in a hole in a wall of the pipe and an upstream end adapted to be disposed outside the pipe. The plug has an interior bore and one or more gas jet nozzles which communicate between the bore and the interior of the pipe.

The sleeve of this invention has a downstream end adapted to be mounted on the outside surface of the wall of the pipe around the periphery of the hole in which the downstream end of the plug is disposed. The sleeve also has an upstream end at the opposite end of the sleeve. The sleeve has an interior bore through which at least a portion of the plug extends. The sleeve also has an upstream end around which the holding cap is adapted to be attached to hold the plug in position within the sleeve.

The gas jet plug has an exterior member, such as a shoulder, disposed around at least a portion of the outer periphery of the plug. The interior bore of the sleeve has an interior member, such as a shoulder, disposed around at least a portion of the interior bore. The interior member of the sleeve is adapted to cooperate with the exterior member of the plug to position the surface of the downstream end of the plug in precise linear alignment with the adjacent interior surface of the pipe, without allowing the downstream end of the plug to extend either too far, or not far enough, into the pipe.

The interior bore of the plug is substantially straight and has a longitudinal axis which is disposed substantially parallel to the longitudinal axis of the plug. THe plug is adapted to convey a gas under pressure through the interior bore of the plug and then through one or more gas jet nozzles into the pipe.

Means are provided to position the gas jet nozzle of the plug to point in the direction of movement of granular particles when the downstream end of the plug is positioned in the pipe. As a result, the gas jet nozzles direct gas flowing through the gas jet nozzles in the direction of movement of the granular particles. In a primary embodiment of this invention, the means include a locating pin disposed on the outer circumference of the plug and a slot through the side wall of the upstream end of the sleeve. In a secondary embodiment of this invention, the means include an indicating means, such as a notch, on the surface of the upstream end of the plug. The indicating means can be precisely aligned with the direction in which the nozzles point.

Both the primary and secondary embodiments of this invention may have either two, three or four gas jet nozzles at the downstream end of the plug.

DESCRIPTION OF THE DRAWINGS

FIG. 5 is a top view of the gas jet plug shown in FIG. 2 having three jet holes.

FIG. 6 is an alternate embodiment of FIG. 5 having two jet holes.

FIG. 7 is another alternate embodiment of FIG. 5 having four jet holes.

FIG. 8 is a cross-sectional view of a secondary embodiment of the gas jet plug assembly of this invention and a portion of a typical pipe wall in which the gas jet plug assembly is positioned when in use.

FIG. 9 is a bottom view of FIG. 8.

DETAILED DESCRIPTION

Figure 1:
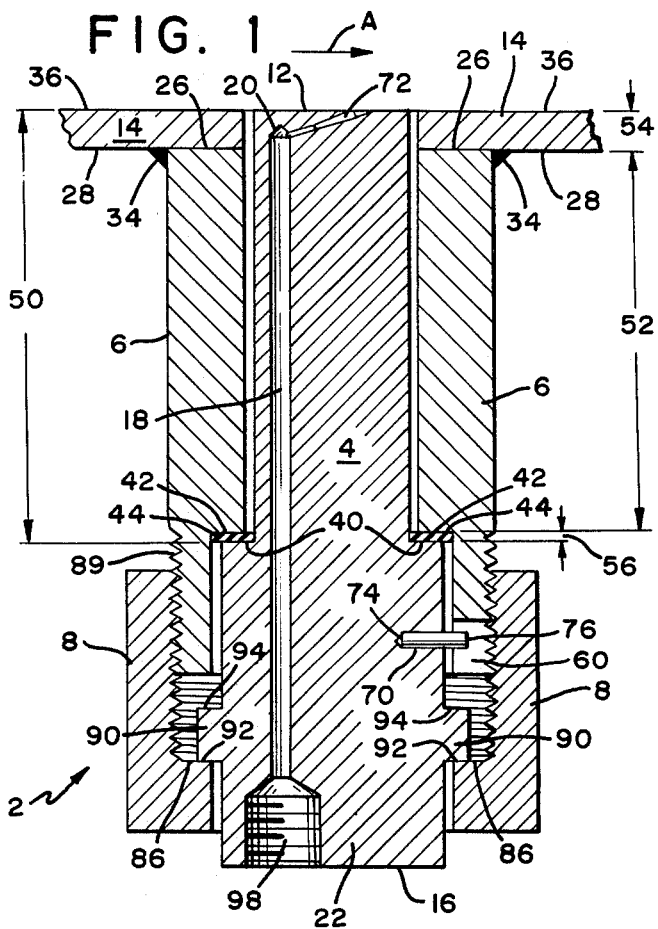
FIG. 1 is a cross-sectional view of a primary embodiment of the gas jet plug assembly of this invention and a portion of a typical pipe wall in which the gas jet plug assembly is positioned when in use.

The apparatus of this invention is an assembly adapted to introduce gas under pressure into a pipe, particularly a pipeline through which granular particles are flowing. The invention is applicable to a wide variety of uses. For example, the apparatus of this invention may be used for supplying steam under pressure to a pipeline through which coal particles are flowing on their way to a coke oven. In this example, the gas jet plug assembly of this invention is an improvement of prior art plugs and is adapted for use in the pipeline charging system described in the foregoing U.S. Patents to Schmidt.

In accordance with the foregoing example, this invention will be explained with reference to a primary embodiment illustrated in FIGS. 1–4 and a secondary embodiment illustrated in FIGS. 8 and 9. Both the primary embodiment and the secondary embodiment are adapted for introducing steam under pressure into a pipe adapted to convey coal particles to a coke oven.

Referring to FIGS. 1–4, the apparatus 2 which is the primary embodiment of this invention includes: a gas jet plug 4; a sleeve 6; and a holding cap 8. The gas jet plug 4 (FIGS. 1 and 2) has a downstream end 12 adapted to be disposed in a hole in a wall 14 of the pipe and an upstream end 16 adapted to be disposed outside the pipe. The plug 4 has an interior bore 18 which extends partially through the plug 4 and which communicates with the interior of the pipe. The bore 18 has a downstream end 20 and an upstream end 22.

The sleeve 6 (FIGS. 1 and 3) is adapted to support the gas jet plug 4 and the holding cap 8. The sleeve 6 has a downstream end 26 adapted to be mounted on the outside surface 28 of the wall 14 of the pipe around the periphery of the hole in which the downstream end 12 of the plug 4 is disposed. The sleeve 6 also has an upstream end 30 at the opposite end of the sleeve 6. The sleeve 6 has an interior bore 32 through which at least a portion of the plug 4 extends. Preferably, the sleeve 6 is mounted at its downstream end 26 at an angle of approximately 90° to the outside surface 28 of the wall 14 of the pipe by means of welds 34 (FIG. 1).

The holding cap 8 (FIGS. 1 and 4) is adapted for use with the sleeve 6 and the plug 4 and is adapted to be disposed around at least a portion of the plug 4 adjacent to the upstream end 16 of the plug 4 and at least a portion of the sleeve 6 adjacent to the upstream end 30 of the sleeve 6. The holding cap 8 is adapted to hold the plug 4 in the sleeve 6. The sleeve 6 in cooperation with the cap 8 holds the surface of the downstream end 12 of the plug 4 in a precise predetermined position with reference to the interior surface 36 of the pipe.

The gas jet plug 4 has an exterior member disposed on or around at least a portion of the exterior periphery of the plug 4. The interior bore 32 of the sleeve 6 has an interior member disposed on or around at least a portion of the interior bore. The interior member of the sleeve 6 is adapted to cooperate with the exterior member of the plug 4 to position the surface of the downstream end 12 of the plug 4 in precise linear alignment with the adjacent interior surface 36 of the pipe.

Figure 2:
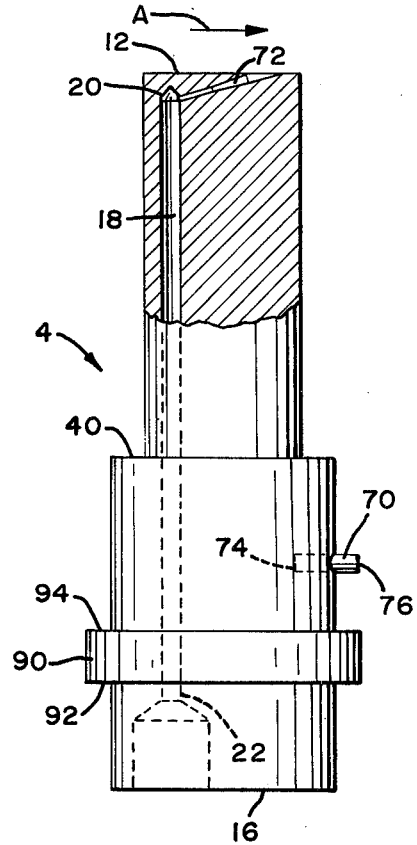
FIG. 2 is a partial cross-section of a gas jet plug which is part of the assembly shown in FIG. 1.
Figure 3:
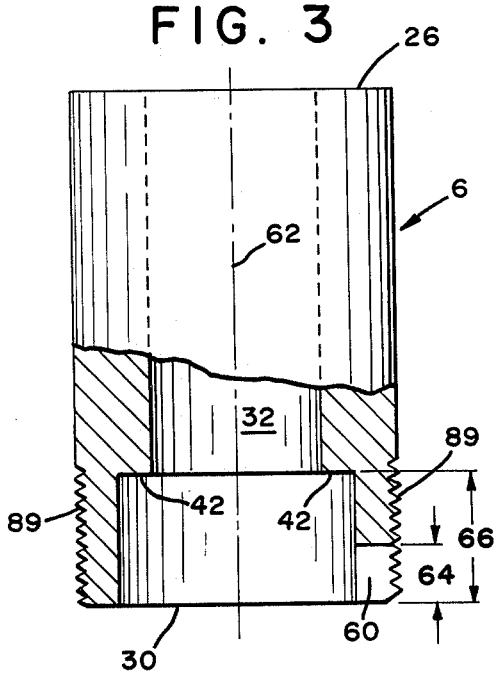
FIG. 3 is a partial cross-section of a sleeve which is part of the assembly shown in FIG. 1.
Figure 4:
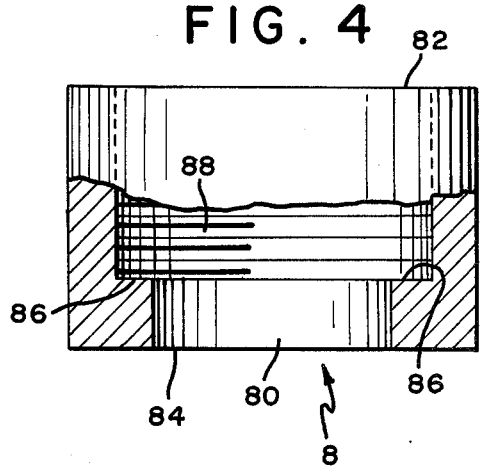
FIG. 4 is a partial cross-section of a holding cap which is part of the assembly shown in FIG. 1.

Preferably, the exterior member of the plug is an exterior shoulder 40 disposed around the exterior periphery of the plug 4, as best shown in FIG. 2. The shoulder 40 faces toward the downstream end 12 of the plug 4. Preferably, the interior member of the sleeve 6 is an interior shoulder 42 disposed around the interior bore 32 of the sleeve 6, as best shown in FIG. 3. The shoulder 42 faces toward the upstream end 32 of sleeve 6. The interior shoulder 42 of the sleeve 6 is adapted to abut against the exterior shoulder 40 of the plug 4. As a result, the abutting shoulders 42 and 40 of the sleeve 6 and plug 4 position the surface of the downstream end 12 of the plug 4 in precise linear alignment with the adjacent interior surface 36 of the pipe.

Preferably, the apparatus of this invention further includes a sealing means, such as a gasket 44, dimensioned to fit between the exterior member of the plug 4 and the interior member of the sleeve 6 for the purpose of providing a seal between these members.

The outer circumference of the gas jet plug 4 is substantially cylindrical. The circumference adjacent to the downstream end 12 of the plug 4 is smaller than the circumference adjacent to the upstream end 16 of the plug 4. The interior bore 32 of the sleeve 6 is substantially circular and has a circumference adjacent to the downstream end 26 of the sleeve 6 which is smaller than the circumference of the interior bore 32 adjacent to the upstream end 30 of the sleeve 6. The circumference of the interior bore 32 adjacent to the downstream end 26 of the sleeve 6, that is, from the interior shoulder 42 to the downstream end 26, is dimensioned large enough to accommodate the outer circumference of the plug 4 adjacent to the downstream end 12 of the plug 4, that is, from the exterior shoulder 40 to the downstream end 12. Similarly, the circumference of the interior bore 32 adjacent to the upstream end 30 of the sleeve 6, that is, from the interior shoulder 42 to the upstream end 30, is dimensioned large enough to accommodate the outer circumference of the plug 4 adjacent to the upstream end 16 of the plug 4, that is, from the exterior shoulder 40 to the upstream end 16. Preferably, a loose fitting tolerance is provided between the outer circumferences of the plug 4 and the inner circumferences of the interior bore 32 of the sleeve 6, along the length of the bore 32.

To insure that the downstream end 12 of the plug 4 is precisely aligned with the adjacent interior surface 36 of the pipe, without extending too far into the pipe or not far enough, the apparatus 2 of this invention should be arranged and dimensioned in the following manner. Referring to FIG. 1, the distance 50 from the exterior shoulder 40 of the plug 4 measured along the length of the plug 4 to the downstream end 12 of the plug 4 should be equal to: the distance 52 from the interior shoulder 42 of the sleeve 6 to the downstream end 26 of the sleeve 6, plus the thickness 56 of the sealing means, such as the gasket 44, when in position between the exterior shoulder 40 of the plug 4 and the interior shoulder 42 of the sleeve 6, plus the thickness 54 of the wall 14 of the pipe around the periphery of the hole in which the plug 4 is disposed. The exterior shoulder 40 of the plug 4 is disposed at a distance from the downstream end 12 of the plug which is equal to from 25% to 75% of the total length of the plug 4. The interior shoulder 42 of the sleeve 6 is disposed at a distance from the downstream end 26 of the sleeve which is equal to from 50% to 90% of the total length of the sleeve 6.

Preferably, the thickness 54 of the adjacent wall 14 is determined. Then the plug 4 and sleeve 6 are dimensioned so that the distance 50 from the exterior shoulder 40 of the plug 4 to the downstream end 12 of the plug 4; minus the distance 52 from the interior shoulder 42 of the sleeve 6 to the downstream end 26 of the sleeve 6; and minus the thickness 56 of the sealing means; equals the thickness 54 of the adjacent wall 14. This arrangement places the downstream end 12 of the plug 4 in precise linear alignment with the adjacent interior surface 36 of the pipe. If a sealing means is not used, the foregoing dimensions of the plug 4 and the sleeve 6 may be adjusted accordingly. As a result, there is no way that the plug 4 will extend too far into the pipe or not far enough. It is important that the plug 4 not extend too far into the pipe because it will obstruct the flow. If the plug 4 does not extend far enough, it will result in the formation of a shallow cavity in the side wall 14 of the pipe.

The sleeve 6 has a slot 60 at the upstream end 30 of the sleeve 6 through the side wall of the sleeve 6. The slot 60 extends parallel to the longitudinal axis 62 of the sleeve 6 along the length of the sleeve 6 from the upstream end 30 of the sleeve to a point part way between the upstream end 30 of the sleeve and the interior shoulder 42 of the sleeve. Preferably, the length 64 of the slot 60 measured parallel to the longitudinal axis 62 of the sleeve 6 from the upstream end 30 of the sleeve 6 is equal to from 25% to 75% of the distance 66 from the upstream end 30 of the sleeve 6 to the interior shoulder 42 of the sleeve 6.

The primary embodiment of the gas jet plug 4 further includes a locating pin 70 and one or more and preferably a plurality of gas jet nozzles 72. The locating pin 70 has a longitudinal axis, an interior end 74 and an exterior end 76. The locating pin 70 is disposed on the outer circumference of the plug 4, adjacent to the upstream end 16 of the plug 4. The plug has a pin bore in which the interior end 74 and an adjacent portion of the pin 70 are disposed. The longitudinal axis of the pin 70 is approximately perpendicular to the longitudinal axis of the plug. The exterior end 76 and an adjacent portion of the pin 70 extend outwardly from the side of the plug 4 and are adapted to be disposed in the slot 60 of the sleeve 6.

Referring to FIGS. 5–7, the gas jet nozzles 72 extend from the downstream end 20 of the bore 18 of the plug 4 to the surface of the downstream end 12 of the plug. Referring to FIGS. 1 and 2, the bore 18 extends substantially but not entirely through the length of the plug 4. Preferably, the bore 18 extends through from 75% to 95% of the length of the plug 4. The nozzles 72 are adapted to communicate between the downstream end 20 of the bore 18 of the plug 4 and the interior of the pipe. The nozzles 72 are adapted to be pointed in the direction of movement of granular particles within the pipe, indicated by arrow A in FIGS. 1 and 2. The nozzles 72 are disposed in alignment with the longitudinal axis of the pin 70. The sleeve 6 is adapted to be mounted on the wall 14 of the pipe so that the slot 60 of the sleeve 6 is precisely aligned with the direction of movement (arrow A) of the granular particles in the pipe. As a result, when the plug 4 is positioned in the sleeve 6, the locating pin 70 of the plug 4 and the slot 60 of the sleeve 6 are adapted to cooperate to position the gas jet nozzles 72 of the plug 4 to point in the direction of movement (arrow A) of granular particles in order to direct the gas flowing through the nozzles 72 in the direction of movement of the granular particles. As a result of the arrangement of the locating pin 70 and the slot 60, there is no way that the plug 4 can be installed in the sleeve 6 without the nozzles 72 being pointed in the correct direction, provided that the slot 60 is turned precisely in the direction of movement (arrow A) of granular particles. Further, no periodic adjustments of the plug 4 are necessary to point the nozzles 72 in the correct direction. The slot 60 and locating pin 70 prevent the plug 4 from rotating. Preferably, the gas jet plug of this invention has three gas jet nozzles 72a, 72b and 72c, as illustrated in FIG. 5. However, other gas jet plugs 4 of this invention may have either two gas jet nozzles 72d and 72e, as illustrated in FIG. 6, or four gas jet nozzles 72f, 72g, 72h and 72k, as illustrated in FIG. 7.

The holding cap 8 further includes an interior bore 80, a downstream end 82 and an upstream end 84. Interior engaging means are provided in the interior bore 80 adjacent to the downstream end 82 of the bore 80. An interior shoulder 86 is provided adjacent to the upstream end 84 of the bore 80. The interior shoulder 86 faces toward the downstream end 82 of the holding cap 81. The sleeve 6 has exterior engaging means adjacent to the upstream end 60 of the sleeve 6. The engaging means of the sleeve 6 are adapted to engage the engaging means of the holding cap 8. As a result, the downstream end 82 of the holding cap 8 is adapted to be mounted on and around the sleeve 6 adjacent to the upstream end 30 of the sleeve 6. Preferably, the interior engaging means in the interior bore 80 of the holding cap 8 are interior screw threads 88. Preferably, also, the exterior engaging means of the sleeve 6 are exterior screw threads 89 which are disposed adjacent to the upstream end 60 of the sleeve 6. The screw threads 88 of the holding cap 8 are adapted to mate with the screw threads 89 of the sleeve 6.

The plug 4 has an exterior flange 90 adjacent to the upstream end 16 of the plug 3. The flange 90 has an upstream shoulder 92 and a downstream shoulder 94. The upstream shoulder 92 of the exterior flange 90 is adapted to abut against the interior shoulder 96 of the holding cap 8 when the plug 4 is positioned within the sleeve 6 and the holding cap is mounted on the upstream end 30 of the sleeve 6. The interior shoulder 86 of the holding cap 8 and the downstream shoulder 92 of the exterior flange 90 of the plug 4 cooperate to hold the plug 4 in the sleeve 6. The means for attaching the holding cap to the sleeve, such as the interior screw threads 88 in the holding cap 8 and the exterior screw threads 89 at the upstream end of the sleeve 6, do not have the effect of pushing the plug a small distance further into the interior of the pipe or removing the plug a small distance from the interior of the pipe. The amount by which the downstream end 12 of the plug 4 extends into the pipe is controlled by the dimensions 50, 52, 54 and 56, as previously explained. The exterior flange 90 of the plug 4 is disposed around the outer circumference of the plug 4 at a distance from the upstream end 16 of the plug 4 which is equal to from 25% to 60% of the distance from the upstream end of the plug 4 to the exterior shoulder 40 of the plug 4. Stated another way, the exterior flange 90 is disposed at a distance from the upstream end 16 of the plug 4 which is equal to from 5% to 25% of the distance from the upstream end 16 of the plug 4 to the downstream end 12 of the plug 4.

The interior bore 18 of the plug 4 is substantially straight and has a longitudinal axis which is disposed substantially parallel to the longitudinal axis of the plug 4. The plug 4 has a means adapted to attach a gas line, (not shown) such as a steam line, to the plug 4. The means are disposed at the upstream end 22 of the interior bore 18. Preferably, the means for attaching the gas line are screw threads 98. Preferably also, the bore 18 is enlarged at its upstream end 22 to a diameter adapted to receive a gas line, such as a steam line.

Referring to FIGS. 5, 6 and 7, each gas jet nozzle 72 has a longitudinal axis 102 and an oriface 104 at the surface of the downstream end 12 of the plug 4. The longitudinal axis 102 of each nozzle 72 extends from a common point at the downstream end 20 of the bore 18. The longitudinal axes of the nozzles 72 radiate outwardly from the common point at an angle from one another to the orifice 104 of the respective nozzle 72. The longitudinal axes 102 of the nozzles form a pie-shaped pattern.

The pie-shaped pattern has a center line 106 extending through the common point at the downstream end 20 of bore 18. The pie-shaped pattern also has a circumferential arc 108 which extends through the orifaces 104 of the nozzles 72. The center line 106 bisects the circumferential arc 108 of the pie-shaped pattern. The center line 106 is precisely aligned with the longitudinal axis of the locating pin 70 of the plug 4. The center line 106 is thereby adapted to be precisely aligned with the direction of movement of the granular particles in the pipe by means of the locating pin 70 and the slot 60 of the sleeve 6.

Referring to FIGS. 8 and 9, the apparatus 109 which is the secondary embodiment of this invention is similar to the apparatus 2 which is the primary embodiment of this invention, except for the means for aligning the gas jet nozzles. Instead of the locating pin 70 used in the primary embodiment of this invention, the secondary embodiment of this invention uses an indicating means disposed at the downstream end 110 of the plug 112. The indicating means are adapted to enable the plug 112 to be installed with the nozzles 72 pointed in the direction of movement of the granular particles within the pipe. Preferably, the indicating means is a notch 114 (FIG. 8). The notch 114 is aligned with the center line 106 of the gas jet nozzles 72 shown in FIGS. 5–7. As a result, when the notch 114 is pointed in the direction indicated by arrow B in FIG. 9, the nozzles 72 are pointed in the direction of movement of the granular particles within the pipe, indicated by arrow A in FIG. 8. The sleeve 116 used in the secondary embodiment need not have the slot 60 at the downstream end 117 of the sleeve 116.

Referring to FIG. 9, after the plug 112 is installed within the sleeve 116, it is easy to tell from the exposed notch 114 whether the nozzles 72 are pointed in the correct direction. Optionally, a permanent mark may be made on the surface of the downstream end 123 of the holding cap 118 to show the direction in which the notch 114 should point. The upstream end 120 of plug 112 has flat projections 122 on the surface of the upstream end 120 of plug 112. These flat projections 122 are adapted to be gripped by a wrench in order to turn the plug 112 and position the notch 114 and the nozzles 72 in precisely the correct direction of movement of granular particles within the pipe. In all other respects, the gas jet plug 112, the sleeve 116 and the holding cap 118 of the secondary embodiment of this invention are identical to the gas jet plug 4, the sleeve 6 and the holding cap 8 of the primary embodiment of this invention.

The secondary embodiment of this invention preferably has three jet nozzles 72a, 72b and 72c, as illustrated in FIG. 5. However, other gas jet plugs 112 of the secondary embodiment of this invention may have either two gas jet nozzles 72d and 72e, as illustrated in FIG. 6, or four gas jet nozzles 72f, 72g, 72h and 72k, as illustrated in FIG. 7.

Preferably, the gas jet nozzles 72 of FIGS. 5–7 each have a venturi shape. Each nozzle 72 diverges in cross-sectional area of the nozzle 72 as the nozzle 72 approaches the oriface 104 and converges in cross-sectional area as the nozzle 72 approaches the downstream end 20 of bore 18. Preferably, each nozzle delivers a jet of superheated steam at an angle of about 5° to 20° with respect to the axis of the pipe in the case of a straight length pipeline at the point where the jet nozzle 72 is positioned. The nozzles 72 provide fan-like jets of steam imparting velocity or impulse to the granular particles of coal being conveyed in the pipe in the direction indicating by arrow A.

In the example of a pipeline for supplying coal particles to a coke oven, the nozzles introduce superheated steam supplied through a gas line (not shown) which is threaded into the upstream end 22 of interior bore 18. The gas, in this case, superheated steam, passes through the interior bore to the downstream end 20 of the interior bore and then into the nozzles 72. A plurality of gas jet plug assemblies of this invention, are intended to be used along the pipeline. It has been found desirable to install one assembly of this invention every 12–15 inches along the pipeline. The steam is introduced into the pipeline at sonic or super-sonic velocity and imparts impulses to the granular particles moving through the pipeline. The velocity of the steam at the point of entry to the pipeline is transformed into energy which is imparted to the coal particles to aid the flow of particles from one assembly of this invention to the next. Further details regarding the use of the apparatus of this invention may be found in the foregoing United States Patents to Schmidt.

We claim:

1. Apparatus for introducing gas into a pipe adapted to convey granular particles comprising:
   a gas jet plug having a downstream end for positioning in a hole in a wall of the pipe and an upstream end for location outside the pipe, said plug having an interior bore having a downstream end and an upstream end, said plug having a gas jet nozzle extending from the downstream end of said bore of said plug to a surface of the downstream end of said plug for communication between said bore of said plug and an interior of said pipe;
   a sleeve for said gas jet plug, said sleeve having a downstream end for mounting on an outside surface of the wall of the pipe around a periphery of said hole in said pipe, an upstream end at the opposite end of said sleeve, an interior shoulder between said upstream end and said downstream end of said sleeve, and an interior bore through which at least a portion of said plug extends;
   a holding cap disposed around at least a portion of the upstream end of said plug and at least a portion of the upsteam end of said sleeve for holding said plug in said sleeve;

means for positioning the surface of the downstream end of said plug in alignment with an adjacent interior surface of said pipe; and means for pointing said nozzle in a direction of movement of said granular particles within the pipe, said pointing means comprising:

a slot at the upstream end of said sleeve, through a side wall of said sleeve, extending parallel to a longitudinal axis of said sleeve along the length of said sleeve from the upstream end of said sleeve to a point between the upstream end of said sleeve and the interior shoulder of said sleeve;

a locating pin having a longitudinal axis, an interior end and an exterior end, the locating pin disposed on the exterior of said plug adjacent to the upstream end of said plug, said plug having a pin bore in which the interior end and an adjacent portion of said pin are disposed, said pin bore having a longitudinal axis approximately perpendicular to the longitudinal axis of said plug, the exterior end and an adjacent portion of said pin extending outwardly from the side of said plug, at least said exterior end of said pin disposed in said slot of said sleeve; and said gas jet nozzle aligned with the longitudinal axis of said pin; said slot of said sleeve aligned with the direction of movement of said granular particles in said pipe when said downstream end of said plug is positioned in said pipe, whereby said locating pin of said plug and said slot of said sleeve cooperate to position the gas jet nozzle of said plug to point in the direction of movement of granular particles in order to direct gas flowing through said nozzle in the direction of movement of said granular particles.

2. The apparatus for introducing gas into a pipe according to claim 1 wherein:

said gas jet plug comprises a plurality of said gas jet nozzles, each gas jet nozzle of said plurality of gas jet nozzles having a longitudinal axis and an orifice at the surface of the downstream end of said plug, each longitudinal axis extending from a common point at the downstream end of said bore and radiating outwardly from said common point at an angle from one another to the orifice of the respective nozzle, said longitudinal axes of said nozzles forming a pie-shaped pattern, said orifices lying along a circumferential arc of said pie-shaped pattern; and said pie-shaped spray pattern having a center line extending through the common point at the downstream end of said bore and bisecting the circumferential arc of said pie-shaped pattern, said center line aligned with said locating pin of said plug and said center line thereby aligned with the direction of movement of said granular particles in said pipe by means of said locating pin and said slot of said sleeve when said downstream end of said plug is positioning in said pipe.

3. The apparatus for introducing gas under pressure into a pipe according to claim 1 wherein:

said gas jet plug has a longitudinal axis and said sleeve has a longitudinal axis;

said exterior member of said gas jet plug is an exterior shoulder disposed around the exterior periphery of said plug, said exterior shoulder having a surface approximately perpendicular to said longitudinal axis of said gas jet plug; and said interior member of said sleeve is an interior shoulder disposed around said interior bore of said sleeve, said interior shoulder having a surface approximately perpendicular to said longitudinal axis of said sleeve, said interior shoulder of said sleeve abutting against said exterior shoulder of said plug, said abutting shoulders of said sleeve and said plug positioning the surface of the downstream end of said plug in alignment with the adjacent interior surface of said pipe.

4. The apparatus for introducing gas into a pipe according to claim 3 wherein:

said gas jet plug is substantially cylindrical, the circumference of said plug adjacent to the downstream end of said plug being smaller than the circumference adjacent to the upstream end of said plug;

said interior bore of said sleeve is substantially circular and has a circumference adjacent to the downstream end of said sleeve which is smaller than the circumference of said bore adjacent to the upstream end of said sleeve, the circumference of the interior bore adjacent to the downstream end of said sleeve being large enough to accommodate the outer circumference of said plug adjacent to the downstream end of said plug, the circumference of the interior bore adjacent to the upstream end of said sleeve being large enough to accommodate the outer circumference of said plug adjacent to the upstream end of said plug; and the distance from said exterior shoulder of said plug measured along the length of said plug to the downstream end of said plug is equal to: the distance from the interior shoulder of said sleeve to the downstream end of said sleeve, plus the thickness of the wall of the pipe around the periphery of the hole in which the plug is to be positioned.

5. The apparatus for introducing gas into a pipe according to claim 3 and further comprising: a sealing means disposed between the exterior shoulder of said plug and the interior shoulder of said sleeve; the distance from the exterior shoulder of said plug measured along the length of said plug to the downstream end of said plug being equal to: the distance from the interior shoulder of said sleeve to the downstream end of said sleeve, plus the thickness of the adjacent wall of said pipe in which the downstream end of the plug is to be positioned, plus the thickness of said sealing means when in position between the exterior shoulder of said plug and the interior shoulder of said sleeve.

6. Apparatus for introducing gas into a pipe adapted to convey granular particles comprising:

a gas jet plug having a downstream end for positioning in a hole in a wall of the pipe and an upstream end disposed outside the pipe, said plug having an interior bore having a downstream end and an upstream end, said plug having a gas jet nozzle extending from the downstream end of said bore of said plug to a surface of the downstream end of said plug for communication between said bore of said plug and the interior of said pipe;

a sleeve for said gas jet plug, said sleeve having a downstream end for mounting on an outside surface of the wall of the pipe around a periphery of said hole in said pipe, an upstream end at the opposite end of said sleeve, an interior shoulder between said upstream end and said downstream end of said sleeve, and an interior bore through which at least a portion of said plug extends;

a holding cap disposed around at least a portion of the upstream end of said plug and at least a portion of the upstream end of said sleeve for holding said plug in said sleeve;

means for positioning the surface of the downstream end of said plug in alignment with the adjacent interior surface of said pipe, said positioning means comprising: an exterior shoulder of said gas jet plug disposed around the exterior periphery of said plug; and an interior shoulder of said sleeve disposed around said interior bore of said sleeve, said interior shoulder of said sleeve abutting against said exterior shoulder of said plug; the distance from said exterior shoulder of said plug measured along the length of said plug to the downstream end of said plug being equal to: the distance from the interior shoulder of said sleeve to the downstream end of said sleeve, plus the thickness of the wall of the pipe around the periphery of the hole in which the plug is to be positioned; and means for pointing said nozzle in the direction of movement of said granular particles within the pipe, said pointing means comprising;

a slot at the upstream end of said sleeve, through a side wall of said sleeve, extending parallel to a longitudinal axis of said sleeve along the length of said sleeve from the upstream end of said sleeve to a point between the upstream end of said sleeve and the interior shoulder of said sleeve;

a locating pin having a longitudinal axis, an interior end and an exterior end, said locating pin disposed on the exterior of said plug adjacent to the upstream end of said plug, said plug having a pin bore in which the interior end and the adjacent portion of said pin are disposed, said pin having a longitudinal axis approximately perpendicular to the longitudinal axis of said plug, the exterior end and an adjacent portion of said pin extending outwardly from the side of said plug, at least said exterior end of said pin disposed in said slot of said sleeve; and said gas jet nozzle aligned with the longitudinal axis of said pin; said slot of said sleeve aligned with the direction of movement of said granular particles in said pipe when said downstream end of said plug is positioned in said pipe, whereby said locating pin of said plug and said slot of said sleeve cooperate to position the gas jet nozzle of said plug to point direction of movement of granular particles in order to direct gas flowing through said nozzle in the direction of movement of said granular particles.

7. The apparatus for introducing gas into a pipe according to claim 6 wherein:

said gas jet jet plug comprises a plurality of said gas jet nozzles, each gas jet nozzle of said plurality of gas jet nozzles having a longitudinal axis and an orifice at the surface of the downstream end of said plug, each longitudinal axis extending from a common point at the downstream end of said bore and radiating outwardly from said common point at an angle from one another to the orifice of the respective nozzle, said longitudinal axes of said nozzles forming a pie-shaped pattern, said orifices lying along a circumferential arc of said pie-shaped pattern; and said pie-shaped spray pattern having a center line extending through the common point at the downstream end of said bore and bisecting the circumferential arc of said pie-shaped pattern, said center aligned with said locating pin of said plug and said center line thereby aligned with the direction of movement of said granular particles in said pipe by means of said locating pin and said slot of said sleeve when said downstream end of said plug is positioned in said pipe.

8. The apparatus for introducing gas under pressure into a pipe according to claim 6 wherein:

said gas jet plug has a longitudinal axis and said sleeve has a longitudinal axis;

said exterior member of said gas jet plug is an exterior shoulder disposed around the exterior periphery of said plug, said exterior shoulder having a surface approximately perpendicular to said longitudinal axis of said gas jet plug; and said interior member of said sleeve is an interior shoulder disposed around said interior bore of said sleeve, said interior shoulder having a surface approximately perpendicular to said longitudinal axis of said sleeve, said interior shoulder of said sleeve abutting against said exterior shoulder of said plug, said abutting shoulders of said sleeve and said plug positioning the surface of the downstream end of said plug in alignment with the adjacent interior surface of said pipe.

9. The apparatus for introducing gas into a pipe according to claim 8 wherein:

said gas jet plug is substantially cylindrical, the circumference of said plug adjacent to the downstream end of said plug being smaller than the circumference adjacent to the upstream end of said plug;

said interior bore of said sleeve is substantially circular and has a circumference adjacent to the downstream end of said sleeve which is smaller than the circumference of said bore adjacent to the upstream end of said sleeve, the circumference of the interior bore adjacent to the downstream end of said sleeve being large enough to accommodate the outer circumference of said plug adjacent to the downstream end of said plug, the circumference of the interior bore adjacent to the upstream end of said sleeve being large enough to accommodate the outer circumference of said plug adjacent to the upstream end of said plug; and the distance from said exterior shoulder of said plug measured along the length of said plug to the downstream end of said plug is equal to: the distance from the interior shoulder of said sleeve to the downstream end of said sleeve, plus the thickness of the wall of the pipe around the periphery of the hole in which the plug is to be positioned.

10. The apparatus for introducing gas into a pipe according to claim 8 and further comprising: a sealing means disposed between the exterior shoulder of said plug and the interior shoulder of said sleeve; the distance from the exterior shoulder of said plug measured along the length of said plug to the downstream end of said plug being equal to: the distance from the interior shoulder of said sleeve to the downstream end of said sleeve, plus the thickness of the adjacent wall of said pipe in which the downstream end of the plug is to be positioned, plus the thickness of said sealing means when in position between the exterior shoulder of said plug and the interior shoulder of said sleeve.

11. Apparatus for introducing gas into a pipe adapted to convey granular particles comprising:

a gas jet plug having a downstream end for positioning in a hole in a wall of the pipe and an upstream end for location outside the pipe, said plug having an interior bore having a downstream end and an upstream end, said plug having a gas jet nozzle extending from the downstream end of said bore of said plug to a surface of the downstream end of said plug for communication between said bore of said plug and an interior of said pipe;

a sleeve for said gas jet plug, said sleeve having a downstream end for mounting on an outside surface of the wall of the pipe around a periphery of said hole in said pipe, an upstream end at the opposite end of said sleeve, an interior shoulder between said upstream end and said downstream end of said sleeve, and an interior bore through which at least a portion of said plug extends;

a holding cap disposed around at least a portion of the upstream end of said plug and at least a portion of the upstream end of said sleeve for holding said plug in said sleeve; and means for pointing said nozzle in a direction of movement of said granular particles within the pipe, said pointing means comprising:

a slot at the upstream end of said sleeve, through a side wall of said sleeve, extending parallel to a longitudinal axis of said sleeve along the length of said sleeve from the upstream end of said sleeve to a point between the upstream end of said sleeve, and the interior shoulder of said sleeve;

a locating pin having a longitudinal axis, an interior end and an exterior end, the locating pin disposed on the exterior of said plug adjacent to the upstream end of said plug, said plug having a pin bore in which the interior end and an adjacent portion of said pin are disposed, said pin bore having a longitudinal axis approximately perpendicular to the longitudinal axis of said plug, the exterior end and an adjacent portion of said pin extending outwardly from the side of said plug, at least said exterior end of said pin disposed in said slot of said sleeve; and said gas jet nozzle aligned with the longitudinal axis of said pin; said slot of said sleeve aligned with the direction of movement of said granular particles in said pipe when said downstream end of said plug is positioned in said pipe, whereby said locating pin of said plug and said slot of said sleeve cooperate to position the gas jet nozzle of said plug to point in the direction of movement of granular particles in order to direct gas flowing through said nozzle in the direction of movement of said granular particles.

12. Apparatus for introducing gas into a pipe adapted to convey granular particles comprising:

a gas connection means having a downstream end for positioning in a hole in the pipe and an upstream end for location outside the pipe, said gas connection means having an interior bore having a downstream end and an upstream end, said gas connection means having a gas jet nozzle extending from the downstream end of said bore of said gas connection means to a surface of the downstream end of said gas connection means for communication between said bore of said gas connection means and an interior of said pipe;

a mounting means for said gas connection means, said mounting means having a downstream end for mounting on an outside surface of said pipe, an upstream end at the opposite end of said mounting means, an interior shoulder between said upstream end and said downstream end of said mounting means, and an interior bore through which at least a portion of said gas connection means extend;

a holding means disposed around at least a portion of the upstream end of said gas connection means and at least a portion of the upstream end of said mounting means for holding said gas connection means in said mounting means;

means for positioning the surface of the downstream end of said gas connection means in alignment with an adjacent interior surface of said pipe; and means for pointing said nozzle in a direction of movement of said granular particles within the pipe, said pointing means comprising:

a slot at the upstream end of said mounting means, through a side wall of said mounting means, extending parallel to a longitudinal axis of said mounting means along the length of said mounting means from the upstream end of said mounting means to a point between the upstream end of said mounting means and the interior shoulder of said mounting means;

a locating pin having a longitudinal axis, an interior end and an exterior end, the locating pin disposed on the exterior of said gas connection means adjacent to the upstream end of said gas connection means, said gas connection means having a pin bore in which the interior end and an adjacent portion of said pin are disposed, said pin bore having a longitudinal axis approximately perpendicular to the longitudinal axis of said gas connection means, the exterior end and an adjacent portion of said pin extending outwardly from a side of said gas connection means, at least said exterior end of said pin disposed in said slot of said mounting means; and said gas jet nozzle aligned with the longitudinal axis of said pin; said slot of said mounting means aligned with the direction of movement of said granular particles in said pipe when said downstream end of said gas connection means is positioned in said pipe, whereby said locating pin of said gas connection means and said slot of said mounting means cooperate to position the gas jet nozzle of said gas connection means to point in the direction of movement of granular particles in order to direct gas flowing through said nozzle in the direction of movement of said granular particles.

13. Apparatus for introducing gas into a pipe adapted to convey granular particles comprising:

a gas connection means having a downstream end for positioning in a hole in the pipe and an upstream end, said gas connection means having an interior bore having a downstream end and an upstream end, said gas connection means having a gas jet nozzle extending from the downstream end of said bore of said gas connection means to a surface of the downstream end of said gas connection means for communication between said bore of said gas connection means and an interior of said pipe;

a fastening means for said gas connection means, said fastening means having a downstream end for mounting on said pipe, an upstream end at the opposite end of said fastening means, and an interior bore through which at least a portion of said gas connection means extends;

means for positioning the surface of the downstream end of said gas connection means in alignment with an adjacent interior surface of said pipe; and means for pointing said nozzle in a direction of movement of said granular particles within the pipe, said pointing means comprising:

an aperture at the upstream end of said fastening means, through a side wall of said fastening means, extending parallel to a longitudinal axis of said fastening means along a portion of the length of said fastening means from the upstream end of said fastening means;

a locating member having an interior end and an exterior end, the locating member disposed on the exterior of said gas connection means adjacent to the upstream end of said gas connection means, said gas connection means having a member bore in which the interior end and an adjacent portion of said member are disposed, the exterior end and an adjacent portion of said member extending outwardly from a side of said gas connection means, at least said exterior end of said member disposed in said aperture of said fastening means; and said gas jet nozzle aligned with said member; said aperture of said fastening means aligned with the direction of movement of said granular particles in said pipe when said downstream end of said gas connection means is positioned in said pipe, whereby said locating member of said gas connection means and said aperture of said fastening means cooperate to position the gas jet nozzle of said gas connection means to point in the direction of movement of granular particles in order to direct gas flowing through said nozzle in the direction of movement of said granular particles.

14. In an apparatus for introducing gas into a pipe adapted to convey granular particles of the type wherein the apparatus includes: a gas jet plug having a downstream end for positioning in a hole in a wall of the pipe and an upstream end for location outside the pipe, said plug having an interior bore having a downstream end and an upstream end, said plug having a gas jet nozzle extending from the downstream end of said bore of said plug to a surface of the downstream end of said plug for communication between said bore of said plug and an interior of said pipe; a sleeve for said gas jet plug, said sleeve having a downstream end for mounting on an outside surface of the wall of the pipe around a periphery of said hole in said pipe, an upstream end at the opposite end of said sleeve, an interior shoulder between said upstream end and said downstream end of said sleeve, and an interior bore through which at least a portion of said plug extends; a holding cap disposed around at least a portion of the upstream end of said plug and at least a portion of the upstream end of said sleeve for holding said plug in said sleeve; the improvement comprising:

means for positioning the surface of the downstream end of said plug in alignment with an adjacent interior surface of said pipe; and means for pointing said nozzle in a direction of movement of said granular particles within the pipe, said pointing means comprising:

a slot at the upstream end of said sleeve, through the side wall of said sleeve, extending parallel to a longitudinal axis of said sleeve along the length of said sleeve from the upstream end of said sleeve to a point between the upstream end of said sleeve and the interior shoulder of said sleeve;

a locating pin having a longitudinal axis, an interior end and an exterior end, the locating pin disposed on the exterior of said plug adjacent to the upstream end of said plug, said plug having a pin bore in which the interior end and an adjacent portion of said pin are disposed, said pin bore having a longitudinal axis approximately perpendicular to the longitudinal axis of said plug, the exterior end and an adjacent portion of said pin extending outwardly from a side of said plug, at least said exterior end of said pin disposed in said slot of said sleeve; and said gas jet nozzle aligned with the longitudinal axis of said pin; said slot of said sleeve aligned with the direction of movement of said granular particles in said pipe when said downstream end of said plug is positioned in said pipe, whereby said locating pin of said plug and said slot of said sleeve cooperate to position the gas jet nozzle of said plug to point in the direction of movement of granular particles in order to direct gas flowing through said nozzle in the direction of movement of said granular particles.

15. In an apparatus for introducing gas into a pipe adapted to convey granular particles of the type wherein the apparatus includes: a gas jet plug having a downstream end for positioning in a hole in a wall of the pipe and an upstream end for location outside the pipe, said plug having an interior bore having a downstream end and an upstream end, said plug having a gas jet nozzle extending from the downstream end of said bore of said plug to a surface of the downstream end of said plug for communication between said bore of said plug and an interior of said pipe; a sleeve for said gas jet plug, said sleeve having a downstream end for mounting on an outside surface of the wall of the pipe around a periphery of said hole in said pipe, an upstream end at the opposite end of said sleeve, and an interior bore through which at least a portion of said plug extends; a holding cap disposed around at least a portion of the upstream end of said plug and at least a portion of the upstream end of said sleeve for holding said plug in said sleeve; the improvement comprising;

means for positioning the surface of the downstream end of said plug in alignment with an adjacent interior surface of said pipe; and means for pointing said nozzle in a direction of movement of said granular particles within the pipe, said pointing means comprising:

an aperture at the upstream end of said sleeve, through the side wall of said sleeve, extending parallel to a longitudinal axis of said sleeve along a portion of the length of said sleeve from the upstream end of said sleeve;

a locating member having an interior end and an exterior end, the locating member disposed on the exterior of said plug adjacent to the upstream end of said plug, said plug having a member bore in which the interior end and an adjacent portion of said member are disposed, the exterior end and an adjacent portion of said member extending outwardly from a side of said plug, at least said exterior end of said member disposed in said aperture of said sleeve; and said gas jet nozzle aligned with said member; said aperture of said sleeve aligned with the direction of movement of said granular particles in said pipe when said downstream end of said plug is positioned in said pipe, whereby said locating member of said plug and said aperture of said sleeve cooperate to position the gas jet nozzle of said plug to point in the direction of movement of granular particles in order to direct gas flow through said nozzle in the direction of movement of said granular particles.

16. Apparatus for introducing gas into a pipe adapted to convey granular particles comprising:

a gas jet plug having a downstream end for positioning in a hole in a wall of the pipe and an upstream end for location outside the pipe, said plug having an interior bore having a downstream end and an upstream end, said plug having a plurality of gas jet nozzles extending from a common point at the downstream end of said bore of said plug to a surface of the downstream end of said plug for communication between said bore of said plug and an interior of said pipe;

a sleeve for said gas jet plug, said sleeve having a downstream end for mounting on an outside surface of the wall of the pipe around a periphery of said hole in said pipe, an upstream end at the opposite end of said sleeve, an interior shoulder between said upstream end and said downstream end of said sleeve, and an interior bore through which at least a portion of said plug extends;

a holding cap disposed around at least a portion of the upstream end of said plug and at least a portion of the upstream end of said sleeve for holding said plug in said sleeve;

means for positioning the surface of the downstream end of said plug in alignment with an adjacent interior surface of said pipe; and means for pointing said nozzle in a direction of movement of said granular particles within the pipe, said pointing means comprising:

a slot at the upstream end of said sleeve, through a side wall of said sleeve, extending parallel to a longitudinal axis of said sleeve along the length of said sleeve from the upstream end of said sleeve to a point between the upstream end of said sleeve and the interior shoulder of said sleeve;

a locating pin having a longitudinal axis, an interior end and an exterior end, the locating pin disposed on the exterior of said plug adjacent to the upstream end of said plug, said plug having a pin bore in which the interior end and an adjacent portion of said pin are disposed, said pin bore having a longitudinal axis approximately perpendicular to the longitudinal axis of said plug, the exterior end and an adjacent portion of said pin extending outwardly from the side of said plug, at least said exterior end of said pin disposed in said slot of said sleeve; and said gas jet nozzle aligned with the longitudinal axis of said pin; said slot of said sleeve aligned with the direction of movement of said granular particles in said pipe when said downstream end of said plug is positioned in said pipe, whereby said locating pin of said plug and said slot of said sleeve cooperate to position the gas jet nozzle of said plug to point in the direction of movement of granular particles in order to direct gas flowing through said nozzle in the direction of movement of said granular particles.

17. Apparatus for introducing gas into a pipe adapted to convey granular particles comprising:

a gas connection means having a downstream end for positioning in a hole in the pipe and an upstream end, said gas connection means having an interior bore having a downstream end and an upstream end, said gas connection means having a gas jet nozzle extending from the downstream end of said bore of said gas connection means to a surface of the downstream end of said gas connection means for communication between said bore of said gas connection means and an interior of said pipe;

a fastening means for said gas connection means, said fastening means having a downstream end for mounting on said pipe, an upstream end at the opposite end of said fastening means, and an interior bore through which at least a portion of said gas connection means extends;

means for pointing said nozzle in a direction of movement of said granular particles within the pipe, said pointing means comprising:

an aperture at the upstream end of said fastening means, through a side wall of said fastening means, extending along a portion of the length of said fastening means from the upstream end of said fastening means; a locating member extending outwardly from a side of said gas connection means, at least the exterior end of said member disposed in said aperture of said fastening means; and said gas jet nozzle aligned with said member; said aperture of said fastening means aligned with the direction of movement of said granular particles in said pipe when said downstream end of said gas connection means is positioned in said pipe, whereby said locating member of said gas connection means and said aperture of said fastening means cooperate to position the gas jet nozzle of said gas connection means to point in the direction of movement of granular particles in order to direct gas flowing through said nozzle in the direction of movement of said granular particles.

* * * * *

UNITED STATES PATENT AND TRADEMARK OFFICE
CERTIFICATE OF CORRECTION

PATENT NO. : 4,021,078
DATED : May 3, 1977
INVENTOR(S) : William F. Hutar and Donald G. Marting It is certified that error appears in the above-identified patent and that said Letters Patent are hereby corrected as shown below:

Column 2, line 33 "THe" should be -- The --.

Column 4, line 24 "cylidrical" should be -- cylindrical --.

Column 6, line 47 "cap is" should be -- cap 8 is --.

Column 7, line 14 "oriface" should be -- orifice --.

Column 8, line 7 "three jet" should be -- three gas jet --.

Column 11, line 26 "comprising;" should be -- comprising: --.

Column 12, line 5 "aligned" should be -- line aligned --.

Column 14, line 10 "extend" should be -- extends --.

Column 16, line 51 "comprising;" should be -- comprising: --.

Signed and Sealed this

Eighth Day of November 1977

[SEAL]

Attest:

RUTH C. MASON
Attesting Officer

LUTRELLE F. PARKER
Acting Commissioner of Patents and Trademarks